US006782432B1

(12) United States Patent
Nelson et al.

(10) Patent No.: US 6,782,432 B1
(45) Date of Patent: Aug. 24, 2004

(54) AUTOMATIC STATE SAVINGS IN A GRAPHICS PIPELINE

(75) Inventors: Scott R. Nelson, Pleasanton, CA (US); Scott C. Randolph, Santa Cruz, CA (US)

(73) Assignee: Intel Corporation, Santa Clara, CA (US)

( * ) Notice: Subject to any disclaimer, the term of this patent is extended or adjusted under 35 U.S.C. 154(b) by 356 days.

(21) Appl. No.: 09/607,623

(22) Filed: Jun. 30, 2000

(51) Int. Cl.[7] .......................... G06F 3/00; G06F 13/12; G06F 1/00
(52) U.S. Cl. ..................... 710/1; 710/5; 710/8; 710/65; 710/260; 712/34; 712/36; 345/502; 345/506; 345/537
(58) Field of Search ................................. 345/418, 619, 345/810, 440, 503, 653, 664, 679, 506, 508, 537; 710/244, 241, 260, 65, 264, 8, 5; 712/34, 36

(56) References Cited

U.S. PATENT DOCUMENTS

| 5,185,599 A | * | 2/1993 | Doornink et al. ........... 345/548 |
| 5,421,028 A | * | 5/1995 | Swanson ..................... 712/42 |
| 5,896,141 A | * | 4/1999 | Blaho et al. ................ 345/541 |
| 6,208,361 B1 | * | 3/2001 | Gossett ....................... 345/536 |
| 6,252,600 B1 | * | 6/2001 | Kohli et al. ................. 345/419 |
| 6,342,892 B1 | * | 1/2002 | Van Hook et al. .......... 345/503 |
| 2002/0130871 A1 | * | 9/2002 | Hill et al. ................... 345/467 |

OTHER PUBLICATIONS

IBM Technical Disclosure Bulltein, Apr. 1992, "Rendering Context Mangager with Rendering Context Extensions", vol. 34, Issue 11, pp. 433–434.*

* cited by examiner

Primary Examiner—Jeffrey Gaffin
Assistant Examiner—Angel L Casiano
(74) Attorney, Agent, or Firm—Libby H. Hope

(57) ABSTRACT

A method, apparatus, and system are described for processing an operation code (op-code) to be transmitted over a data path of a graphics pipeline. If the op-code comprises context state information for a first graphics context, then the context state information is transmitted to registers in the graphics pipeline over the graphics pipeline data path. If the op-code comprises a save state command, then context state information in the registers is retrieved and transmitted from the registers to a preallocated region of a frame buffer over the same graphics pipeline data path. If the op-code comprises a restore/load state command, then new context state information is loaded. Context state information for a second context can then be loaded on the graphics pipeline data path to restore or process a new context.

14 Claims, 5 Drawing Sheets

AUTOMATIC STATE SAVINGS IN A GRAPHICS PIPELINE

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

FIELD OF THE INVENTION

This invention relates to the field of computer graphics, and more specifically, to saving the state of a graphics pipeline when processing an image for display to a computer monitor.

BACKGROUND OF THE INVENTION

Generally, the field of three-dimensional (3D) computer graphics is concerned with generating and displaying 3D objects in a two-dimensional (2D) space, such as a display screen. This is accomplished by converting information about 3D objects into a bit map that is displayed. This process is called rendering, a multi-part process by which a computer turns an application model description of an image into a screen image. The basic idea is that the processing of information in three-dimensional computer graphics occurs in a series of stages in a graphics pipeline, where each stage generates results for a successive stage.

The process starts with an application model for describing an object using three-dimensional coordinates.(x, y, z), where the object is defined by large numbers of basic geometrical shapes called primitives that define the shape of components of the object. Examples of primitives that make up an object include triangles, lines, dots, circles, ellipses, arcs, texts, polylines, and polygons. In addition to primitives, an application model stores object attributes such as size, color, line width, and surface texture, as well as connectivity relationships and positioning data that describe how the components fit together. In addition to primitives and attributes, geometric transformations for scaling, rotating, and positioning components, and for specifying how components are to be viewed in 3D, for example, may also be specified.

The application model for a given object is created by an application program, and stored in an application database. Using a graphics API (application programming interface), a series of graphics output commands that contain both a detailed geometric description of what is to be viewed and the attributes describing how the objects should appear, the application program converts the application model to a sequence of commands, which are then processed by a graphics pipeline to generate a view of the model. The graphics API typically consists of a set of output subroutines corresponding to the various primitives, attributes, and other elements, which are all collected in a graphics package that can be called from high-level languages such as C, Pascal, or LISP.

Data in the application database may include geometric data or state information. Geometric data defines primitives, such as triangles, lines, or dots. For example, geometric data may include vertices. State information comprises data that controls a particular value or mode, and is stored in a memory, such as registers. For example, state information may set the current depth cue color to black, or disable blending of pixel data into the frame buffer.

When a graphics system switches from an application running in one window (one context) to an application running in another (second context), context state information for one application must be saved at various stages in the graphics pipeline while context state information for the other application is restored. To save and restore applications in this fashion, some existing systems require that the entire graphics pipeline for a first context be flushed in order to obtain the current state of the first context prior to a second context being restored. Once the pipeline is drained, its state is then saved to a local memory, and context state information for the second context can be restored or loaded. One drawback to this method is the lagtime in waiting for the pipeline to drain before the state of another context can be restored.

One solution to this problem is to keep a copy of context state information in software or in registers at the top of the hardware graphics pipeline, which would avoid the need to flush the graphics pipeline. However, this solution either requires a significant amount of additional software code to keep track of all current register values, or requires additional storage registers and register address decode logic to save a copy of each register before it is sent into the graphics pipeline. A drawback of this method is that software is needlessly complicated, and extra storage registers and decode logic are required. Furthermore, an alternate data path must be used to save first context state information while the second context state information is restored.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

Figure 1:
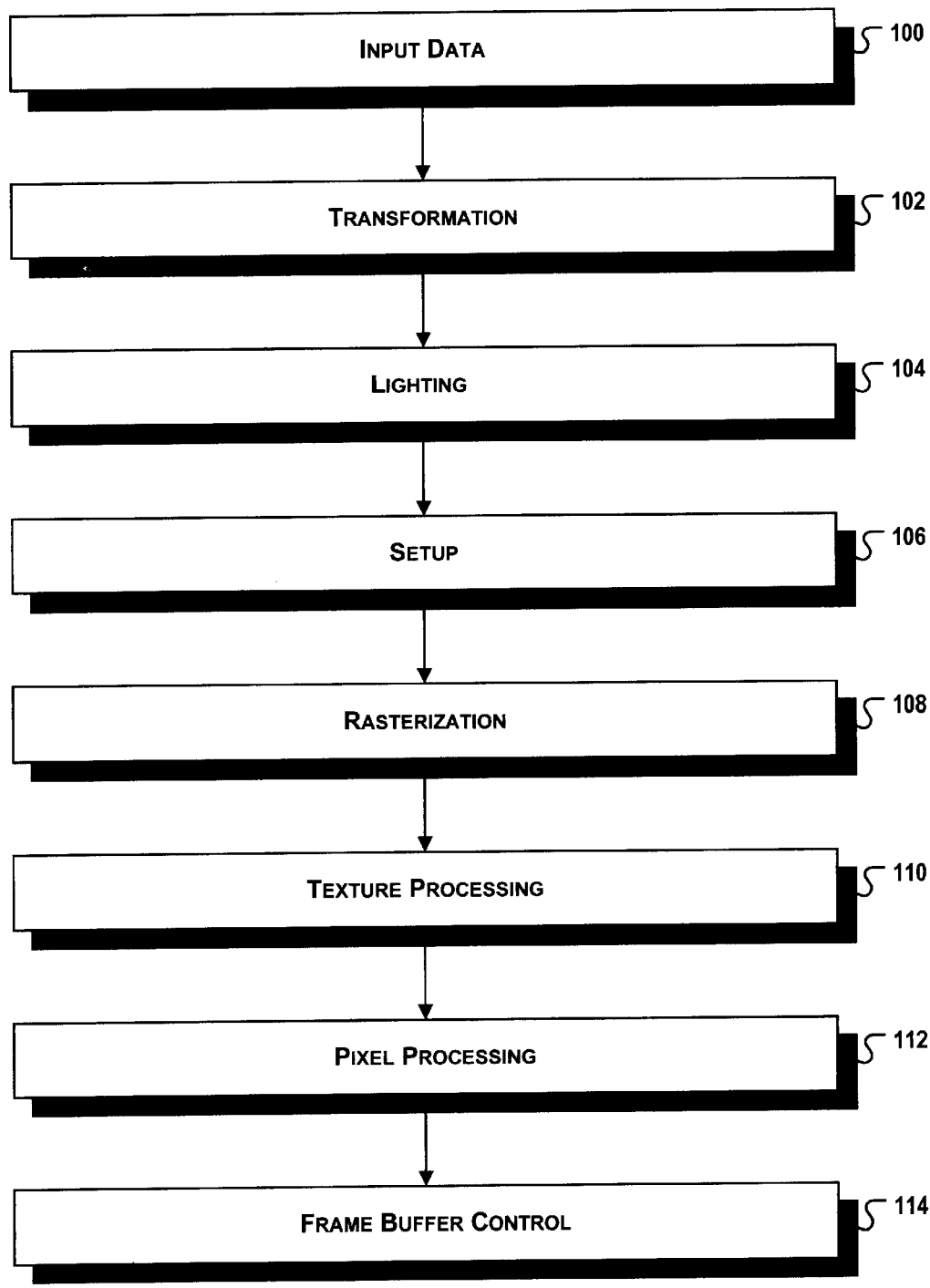
FIG. 1 is a block diagram of a generic graphics pipeline.

According to one aspect of the invention, a method for use in a graphics pipeline is provided. The method automatically saves context state information for the context of one application while context state information for the context of another application is restored, such that context state information in both contexts is saved and restored on the same data path. The graphics pipeline accepts as input operation codes (hereinafter "op-code") that may be accompanied by data. An op-code may indicate that there is accompanying data that comprises geometric data, or that comprises context state information. If the accompanying data comprises geometric data, the geometric data is sent through the graphics pipeline for processing. If the accompanying data comprises context state information, the context state information is sent to a first storage area corresponding to a particular stage (as indicated by an address accompanying the context state information) in the graphics pipeline. The op-code may indicate that the current, first context state information is to be saved, in which case all current context state information in the first storage area is loaded into the graphics pipeline data path, and saved into a memory. Simultaneously, second context state information is loaded onto the same graphics pipeline data path, but held up behind first context state information. Since all input into the graphics pipeline is accompanied by an op-code, thereby directing data to a first memory location, there is no need for a separate data path for saving context state information.

The present invention includes various steps, which will be described below. The steps of the present invention may be performed by hardware components or may be embodied in machine-executable instructions, which may be used to cause a general-purpose or special-purpose processor or logic circuits programmed with the instructions to perform the steps. Alternatively, the steps may be performed by a combination of hardware and software.

The present invention may be provided as a computer program product which may include a machine-readable medium having stored thereon instructions which may be used to program a computer (or other electronic devices) to perform a process according to the present invention. The machine-readable medium includes any mechanism for storing or transmitting information in a form readable by a machine (e.g., a computer). For example, a machine-readable medium may include, but is not limited to, floppy diskettes, optical disks, CD-ROMs, and magneto-optical disks, ROMs, RAMS, EPROMs, EEPROMs, magnet or optical cards, flash memory, or other type of media/machine-readable medium suitable for storing electronic instructions. Moreover, the present invention may also be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection). Accordingly, herein, a carrier wave shall be regarded as comprising a machine-readable medium.

Introduction

FIG. 1 illustrates a typical 3D graphics pipeline. All 3D pipelines, both hardware and software, perform approximately the same operations shown in FIG. 1, and in approximately the same order. Input data 100 generally comes from the system memory in the application data space, but may come from other sources as well. For example, it can be generated directly by the CPU, or stored in the graphics device itself. The data is transmitted to the graphics pipeline through a hardware interface. Transformation 102 involves converting coordinates from model space to screen space, including clip testing and any clipping operations. Lighting 104 involves computing vertex colors based on a vertex normal and pre-specified material colors. It may optionally involve a color per vertex. Setup 106 involves computing the slopes of the edges of the triangle as well as the gradients (changes in the X and Y directions) of the depth, color, and texture parameters. The setup algorithm is matched with the rasterization algorithm used. Rasterization 108 involves finding all valid pixel samples for a triangle and computing the correct depth, color and texture value at each sample point.

The texture unit 110 involves looking up one or more texel values from texture memory and performing texture-specific blend operations on the incoming pixel color. Pixel processing 112 is sometimes referred to as fragment processing, and has operations that occur once per pixel, such as depth compare, pixel blend, and other similar operations. The frame buffer control 114 represents the actual memory control operations and address translation required to get pixels to and from the frame buffer, where the contents of a single screen image are held. The frame buffer control also includes the logic required to refresh the display along with any required color lookup tables for indexed colors and any gamma correction logic.

Figure 2:
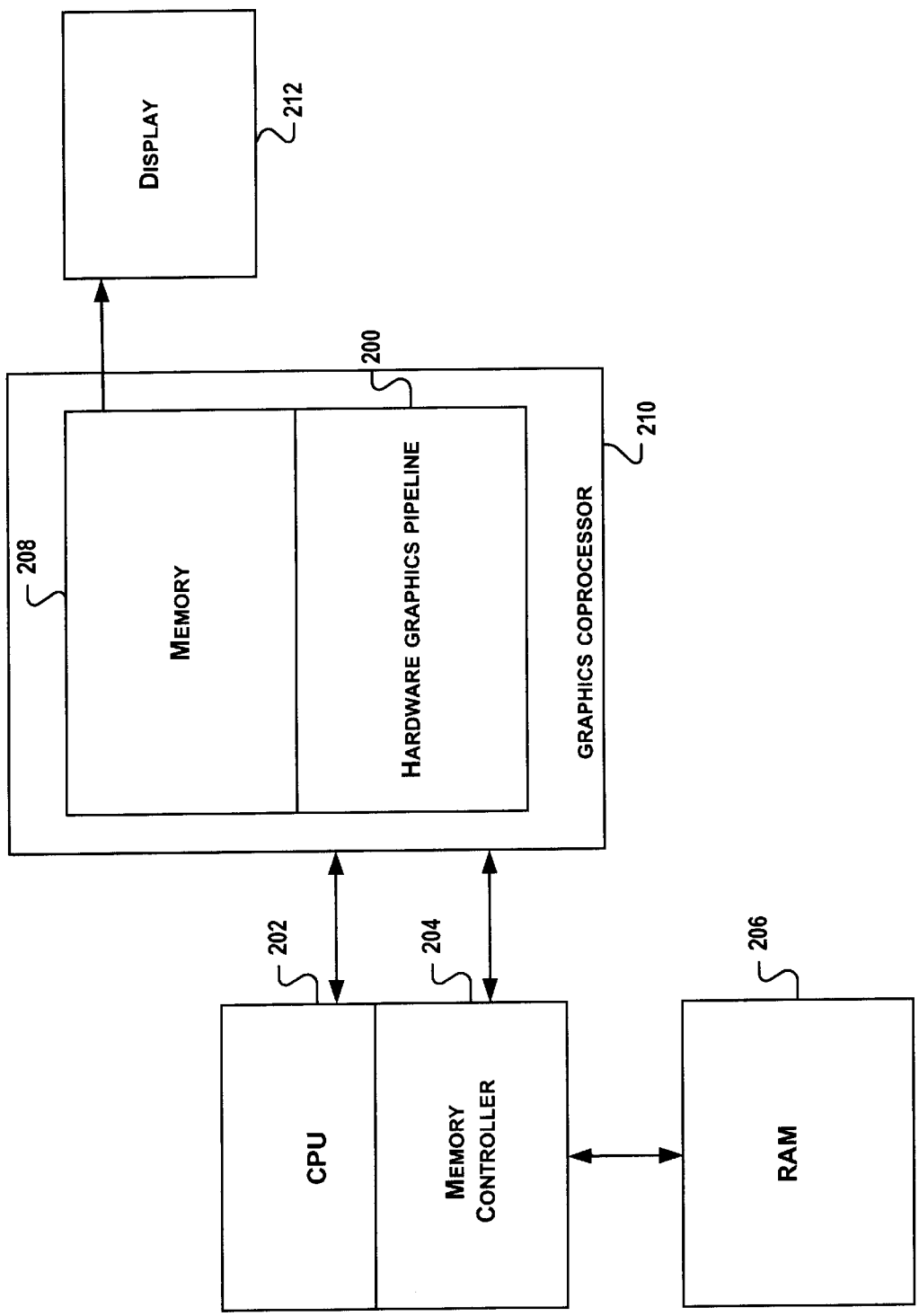
FIG. 2 shows an architecture in which embodiments of the present invention are preferably implemented.

A graphics pipeline in accordance with the invention is preferably implemented as a software and hardware hybrid. Certain functionality of the graphics pipeline is implemented in hardware, and certain functionality is implemented in software. As illustrated in FIG. 2, a graphics pipeline is implemented in a graphics coprocessor design, where a CPU chip is designed to work with a graphics coprocessor 210. A RAM 206 (random access memory) comprises application database having object information. A memory controller 204 accesses data in RAM 206 and forwards to a CPU 202 (central processing unit) for graphics pipeline processing. CPU 202 interacts with a hardware graphics pipeline 200 to share graphics pipelining functionality. Processed data is stored in a frame buffer in the hardware graphics pipeline 200, and state information is stored in memory 208. The resulting 3D (three-dimensional) image is then transferred to a display 212. Alternatively, a graphics controller on the same die as a CPU, and sharing the cache and memory controller may be used.

Figure 3:
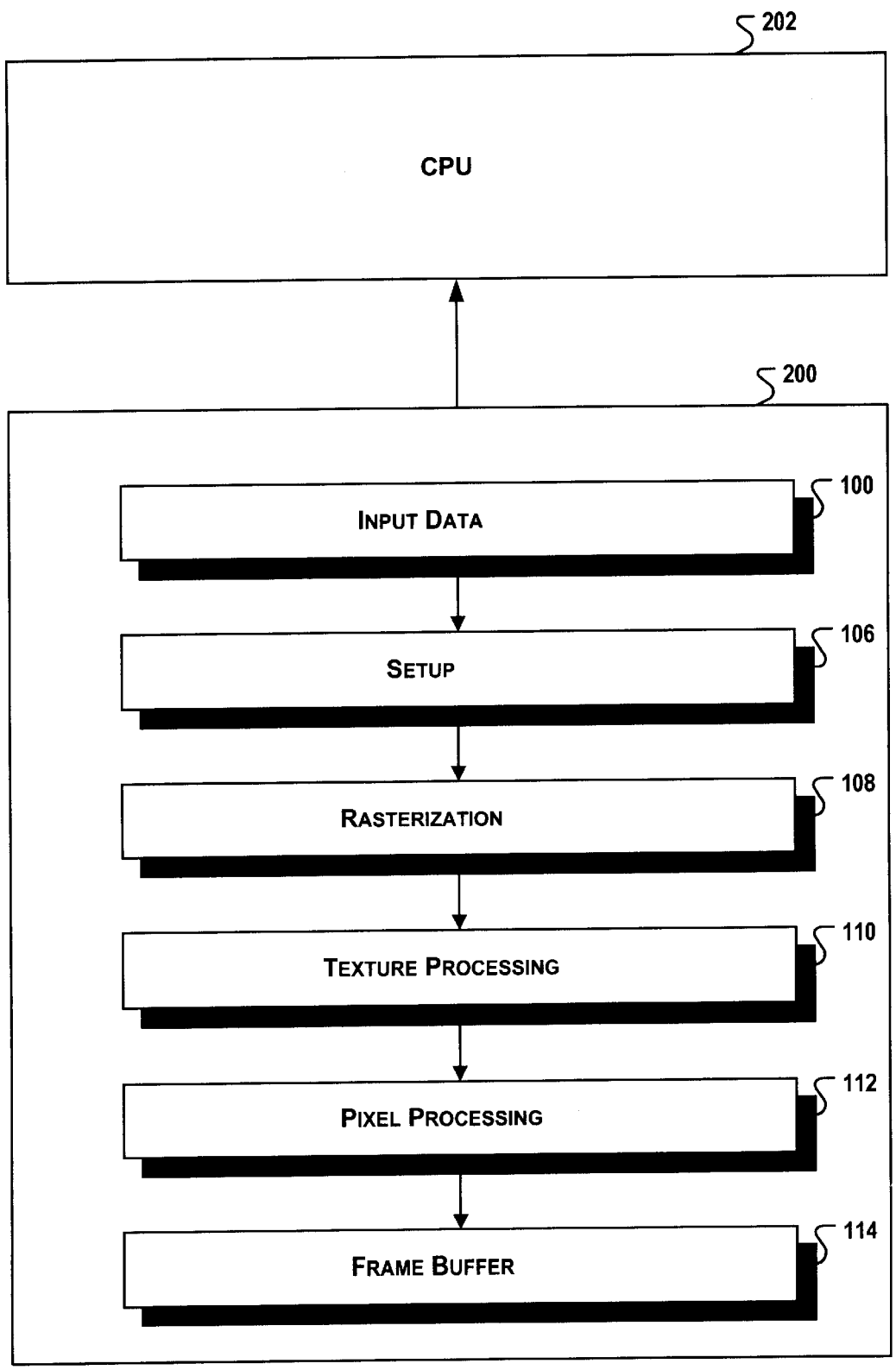
FIG. 3 is a block diagram of a hardware graphics pipeline in preferred embodiments of the invention.

"In an exemplary embodiment of the invention, transformation 102 and lighting 104 are implemented in software, and the remaining stages 106–114 are implemented in hardware. The resulting hardware graphics pipeline (i.e., graphics pipeline modules implemented in hardware) is illustrated in FIG. 3. Also in preferred embodiments, memory 208 may comprise a preallocated region of the frame buffer, hereinafter referred to as the frame buffer memory, for storing context state information. Throughout the remainder of this description, the invention will be described with reference to storing context state information in the frame buffer memory. However, it should be understood by one of ordinary skill in the art that the invention is not so limited, and that any memory accessible to the lower graphics pipeline may be used."

Stages and Registers

Each module in a graphics pipeline may comprise one or more stages for processing data. For example, the rasterization unit may comprise a stage for computing the depth, a stage for computing the color, and a stage for computing the texture for a given primitive. Each stage, therefore, computes the context state of an application as a primitive is processed through the graphics pipeline. For example, a given graphics pipeline may comprise two hundred stages, where each module may have 30, 40, or even 100 stages.

Furthermore, each stage may comprise a number of corresponding storage areas for storing context state information 514, 516 for a first context. In preferred embodiments of the invention, the first storage areas comprise registers 520, 522, 524. Throughout the remainder of this description, it should be: understood by one skilled in the art that context state information storage areas may comprise areas other than registers without departing from the scope of the invention. However, for ease of readability, registers will be described.

Context state information 514, 516 then operates on geometric data that subsequently passes through the stage corresponding to the registers 520, 522, 524. For example, in the rasterization module, one of the stages may process the current depth cue color, and context state information sent through the pipeline. (to the address of that particular stage) sets the depth cue color to black. Or, the texture unit may comprise a stage for blending pixel data, and context state information sent through the pipeline (the address of that particular stage) disables the feature.

Operation Codes

"Through a series of data inputs to the graphics pipeline, an image is synthesized. CPU reads data 512, 514, 516 from application database and inputs the data to graphics pipeline for processing. Processed data is then stored in frame buffer, and written to a display. CPU may input different types of data 512, 514, 516 to graphics pipeline for processing. The type of data passing through a pipeline is identified by a corresponding op-code 500, 502, 504, and its destination is indicated by a corresponding address 506, 508, 510. Context state information 514, 516 is stored in registers 520, 522 in the graphics pipeline, and geometric data 512 is processed by the context state information as the geometric data 512 is sent through the graphics pipeline. CPU may also cause the current context state information to be saved, so that a new context may be restored or loaded."

Process Geometric Data Command

Geometric data comprises data defining primitives, such as pixel data, texel data, and vertex data. Certain data may bypass the graphics pipeline in some cases. For example, pixel data is destined for the frame buffer, and texel data is destined for texture map memory. Pixel data is a specific point to be written to a display, and may be written directly to a frame buffer, the portion of a computer's display memory that holds the contents of a single screen image. In preferred embodiments, pixel data may require additional processing by the pixel processing module, such as blends or depth compares, before it is sent to the frame buffer.

Geometric data may also comprise vertex data to define a primitive in the early stages of the graphics pipeline, and at later stages being converted into pixels. In preferred embodiments, vertex data is written into a 64-word region, then redirected to a 32-word buffer to be sent on to the Setup module. Each of the 64-words has an 8-bit code to indicate its destination. Geometric data has a corresponding op-code identifying the data as geometric data to be processed in the graphics pipeline.

Register Write Command

Data may alternatively comprise context state information having a corresponding register address. Context state information controls a particular value or mode relative to some corresponding geometric data. For example, context state information may set the current depth cue color for a primitive to black, or disable the blending of pixel data into the frame buffer. An op-code for a register write command tells the graphics pipeline to write the context state information to one or more registers corresponding to a stage in the graphics pipeline. The stage is determined by the register address corresponding to the data.

Context state information is written through the graphics pipeline before the geometric data that its attributes should apply to so that the state information takes effect in the right order relative to its geometric data. For example, if at some point in the rendering process all triangles are to be drawn as red, then a command for doing this will be sent to a register at the appropriate stage (i.e., a stage where color attributes are set), and then all triangle data that should be colored red are sent through.

Generally, context state information and geometric data are continuously loaded in a predetermined order such that the context state information is loaded before its corresponding geometric data. Since the registers in some stages, however, affect the processing of data for subsequent stages, context state information for registers corresponding to these particular stages cannot be loaded until the previous geometric data has passed through the stages subsequent to the particular stage.

Save State Command

An op-code may comprise a save state command that retrieves context state information from all stages that have context state information (i.e., data in corresponding registers) and saves it to the frame buffer memory. The save state command is loaded into the pipeline and recognized by each stage containing state information. Immediately after a state saving command is recognized by a given stage, all state information for that stage is loaded into the pipeline data path accompanied by an op-code indicating that the context state information is to be written to a frame buffer memory. The frame buffer memory may be assigned at the beginning of a particular graphics context, or its address may be sent right before the state saving command for a particular graphics context. Context state information is then stored in the frame buffer memory.

Restore/Load State Command

When a restore state command is received 416, context state information and corresponding geometric data from the frame buffer memory is read 418, and inputted to graphics pipeline as register write commands 420 on the graphics pipeline data path behind the previous context state information. Similarly, if a load state command is received, context state information for a new context is loaded. In both cases, data from the frame buffer memory 418 is processed the same way that data read from the applications database is processed.

In preferred embodiments, a restore/load state command triggers a save state command. In other words, when a new context is to be restored/loaded, then a save state command is sent to save the state of the current context, and a restore/load state command is sent to load the new state.

Context Switching

Figure 4:
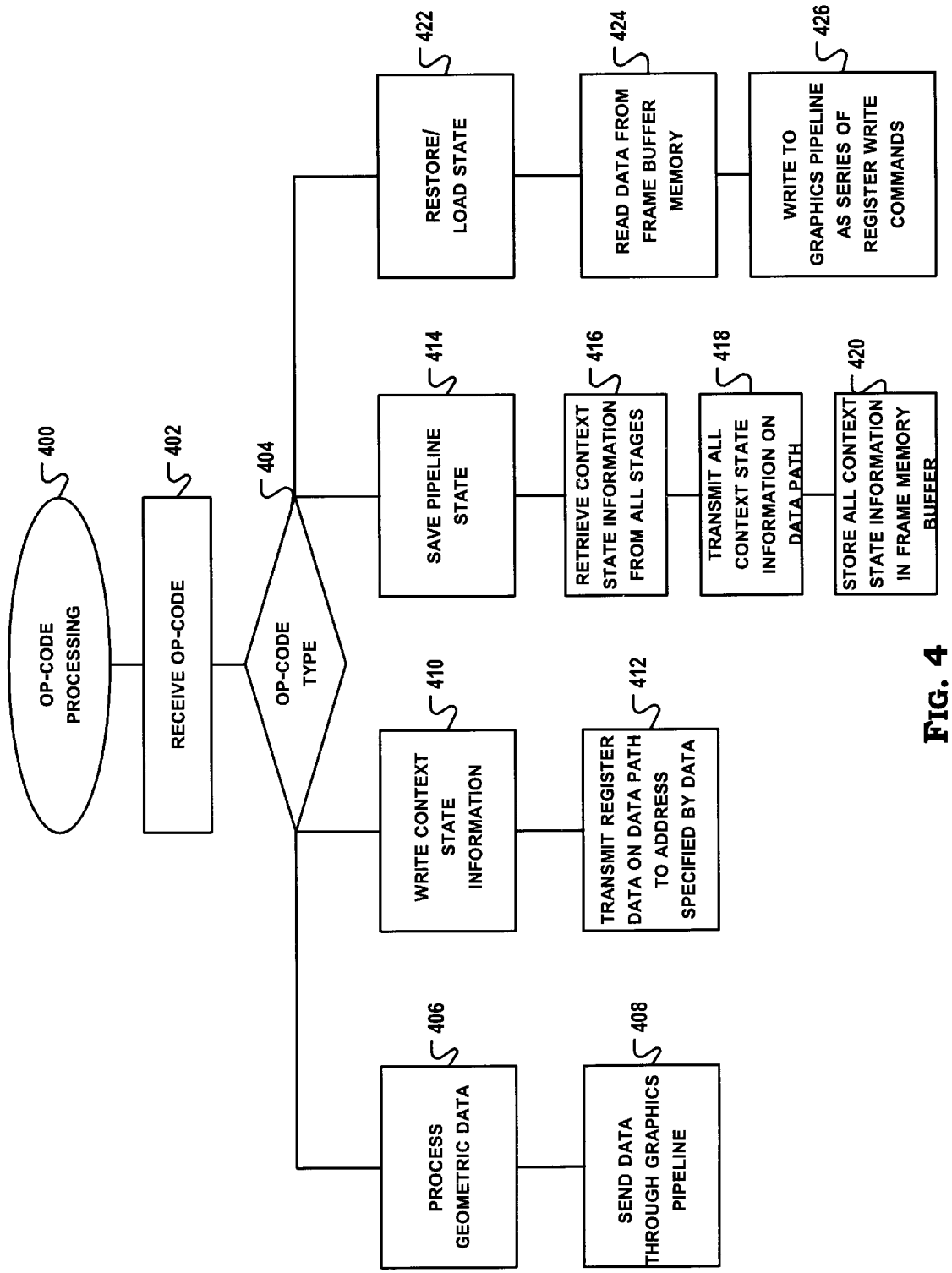
FIG. 4 is a flowchart illustrating a method in preferred embodiments of the invention.
Figure 5:
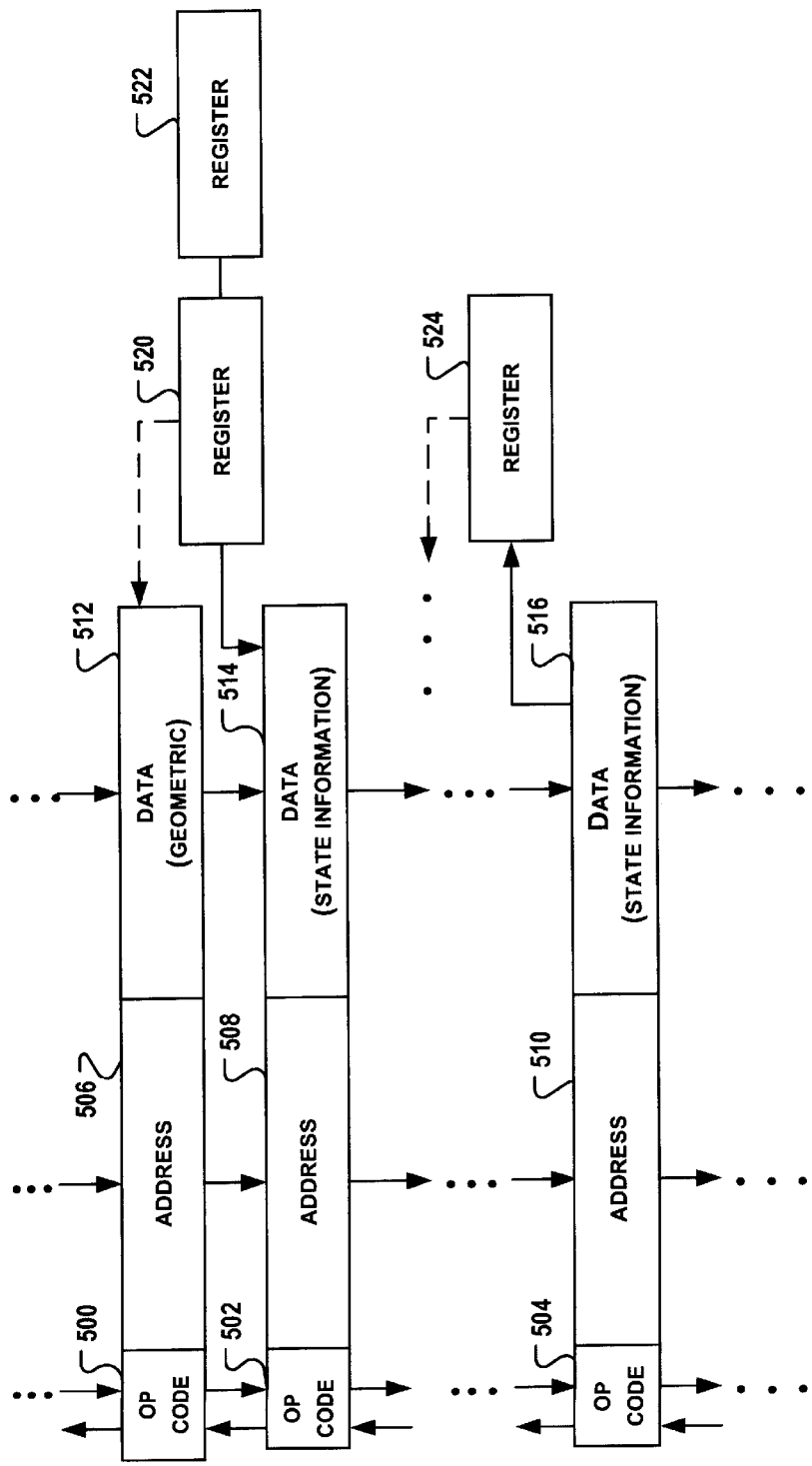
FIG. 5 illustrates an apparatus in preferred embodiments of the invention.

"A method in preferred embodiments of the invention described herein is illustrated in FIG. 4. An op-code is processed at block 400 when it is received in the graphics pipeline at block 402. The op-code type is evaluated at block 404. If the op-code indicates that geometric data is to be processed at block 406, then the accompanying data is sent through the graphics pipeline for processing at block 408. If the op-code indicates that context state information should be written to register in the graphics pipeline at block 410, then the accompanying state information is transmitted to the register address specified by the data onto the graphics pipeline data path at block 412."

If the op-code is a save state command to save the current state of the pipeline for a first context at block 414, then context state information for all stages of the first context is retrieved at block 416, transmitted onto the graphics pipeline data path at block 418, and then stored in the frame buffer memory at block 420. At this point, corresponding geometric data has been processed into pixels, stored in frame buffer, and written to display by frame buffer control.

While context state information for the first context is saved and loaded into the graphics pipeline data path destined for the frame buffer memory, second context state information is immediately loaded into the graphics pipeline behind the first context state information. The new data is held up behind the first context state information until the first context state information is loaded onto the graphics pipeline data path. Second context state information may comprise context state information for a previously running application, or it may comprise context state information for a completely new application.

"When an op-code being input to the graphics pipeline indicates a restore/load state command for the first graphics context at block 422, the CPU reads data from the frame buffer memory 424, and then writes it to the graphics pipeline as a series of register write commands 426. Since context state information is stored in a specific order, register addresses that context state information is to be written to can be easily determined. Once the appropriate registers have been written into the graphics pipeline, geometric data may once again be sent through the graphics pipeline for processing. The first graphics context would continue to be processed at the point where it was stopped for he context switch by reading in more data from the application database."

"An op-code may also indicate the presence of other data, in which case the data is passed through unmodified."

Conclusion

As such, a graphics context can be saved without requiring duplicate storage and a separate data path, and does not require the rendering process to be halted while the graphics pipeline is flushed. Instead, a graphics context is saved by utilizing op-codes to control data that is passed through the graphics pipeline, and by storing context state information in registers throughout the graphics pipeline using the same data path that geometric data is sent on. Since all graphics pipeline data is accompanied by an op-code, the state of one context can be saved (accompanied by an op-code that says to send the context state information to the frame buffer) while the state of another context is restored (in the case of an alternating context, where the data is accompanied by an op-code that says to write the data to registers)), or newly processed (in the case of a completely new context).

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a :restrictive sense.

For example, the invention is not limited to the graphics pipeline hardware/software hybrid described herein. It should be understood that it is within the scope of this invention that any graphics pipeline having registers for storing data may be used. Similarly, the invention is not limited to the graphics pipeline architecture and/or modules described herein. It should further be understood that other op-codes may be used to describe the functionality of the op-codes described herein, and that the op-codes are not limited to the functionality described herein. Other op-codes may exist, and other data may exist without departing from the spirit of the invention. Also, any memory that is accessible to the lower graphics pipeline, including a frame buffer memory, may be used to store context state information, and storage areas for storing context state information may include areas other than registers.

What is claimed is:

1. A method comprising:
   in response to a command to switch from a first graphics context to a second graphics context:
   retrieving context state information for the first graphics context, the context state information including stage information for one or more stages of a graphics pipeline, and retrieved from one or more storage areas; and
   simultaneously loading the context state information for the first graphics context and context state information for the second graphics context into a graphics pipeline data path while keeping the context state information for the second graphics context behind the context state information for the first graphics context in the graphics pipeline data path; and
   storing the context state information for the first graphics context in a memory, the context state information including stage information for a given stage of the first graphics context and a corresponding operation code indicating to which of the one or more storage areas the stage information corresponds.

2. The method of claim 1, wherein the context state information for the second graphics context includes stage information for one or more stages of the graphics pipeline, the method additionally comprising, for each stage of the second graphics context, writing stage information into one or more storage areas corresponding to a stage associated with the stage information.

3. The method of claim 1, wherein in response to a command to restore the first graphics context while the second graphics context is processed:
   retrieving context state information for the second graphics context, the context state information including stage information for one or more stages in the graphics pipeline;
   reading context state information for the first graphics context from the memory;
   simultaneously loading the context state information for the second graphics context and the context state information for the first graphics context into the graphics pipeline data path while keeping the context state information for the first graphics context behind the context state information for the second graphics context in the graphics pipeline data path;
   for each stage of the first graphics context, writing stage information into one or more storage areas corresponding to a stage associated with the
   stage information; and
   storing the context state information for the second graphics context in a memory.

4. The method of claim 3, additionally comprising in response to receiving a command to process data, the command including an address to a storage area having stage information, the method additionally comprising processing the data in accordance with the stage information.

5. The method of claim 3, additionally comprising in response to receiving a command to write context state information to a storage area, the method additionally comprising storing the context state information in one or more storage areas indicated by the command.

6. A system comprising:
   a RAM (random access memory) to store information associated with an application;
   a memory controller to access the Information from the RAM; and
   a graphics coprocessor to:
   in response to receiving information from the memory controller that includes a command to switch from a first graphics context to a second graphics context;

retrieve context state information for the first graphics context, the context state information Including stage information for one or more stages of a graphics pipeline; and simultaneously load the context state information for the first graphics context and context state information for the second graphics context into a graphics pipeline data path while keeping the context state information for the second graphics context behind the context state information for the first graphics context in the graphics pipeline data path; and store the context state information for the first graphics context in a memory, the context state information including stage information for a given stage of the first graphics context and a corresponding operation code indicating to which of the one or more storage areas the stage information corresponds.

7. The system of claim 6, wherein in response to a command to restore the first graphics context while the second graphics context is processed, the graphics coprocessor to additionally:

retrieve context state information for the second graphics context, the context state information including stage information for one or more stages in the graphics pipeline;

read context state information for the first graphics context from the memory;

simultaneously load the context state information for the second graphics context and the context state information for the first graphics context into the graphics pipeline data path while keeping the context state information for the first graphics context behind the context state information for the second graphics context in the graphics pipeline data path;

for each stage of the first graphics context, write stage information into one or more storage areas corresponding to a stage associated with the stage information; and store the context state information for the second graphics context in the memory.

8. The system of claim 7, additionally comprising in response to receiving a command to process data, the command including an address to a storage area having stage information, the graphics coprocessor to additionally process the data in accordance with the stage information.

9. The system of claim 7, additionally comprising in response to receiving a command to write context state information to a storage area, the graphics coprocessor to additionally store the context state information in one or more storage areas indicated by the command.

10. An apparatus comprising:

a first logic circuit to retrieve context state information for a first graphics context, the context state information including stage information for one or more stages in a graphics pipeline, the retrieving performed in response to a command to switch from a first graphics context to a second graphics context; and a second logic circuit to simultaneously load the context state information for the first graphics context and context state information for the second graphics context into a graphics pipeline data path while keeping the context state information for the second graphics context behind the context state information for the first graphics context in the graphics pipeline data path; and a third logic circuit to store the context state information for the first graphics context in a memory, the context state information including stage information for e given stage of the first graphics context and a corresponding operation code indicating to which of the one or more storage areas the stage information corresponds.

11. The apparatus of claim 10, wherein in response to a command to restore the first context state while the second context state is processed:

the first logic circuit to additionally retrieve context state information for the second graphics context, the context state information including stage information for one or more stages in the graphics pipeline;

the second logic circuit to additionally:

read context state information for the first graphics context from the memory;

simultaneously load the context state information for the second graphics context and the context state information for the first graphics context into the graphics pipeline data path while keeping the context state information for the first graphics context behind the context state information for the second graphics context in the graphics pipeline data path;

for each stage of the first graphics context, a fourth logic circuit to write stage information into one or more storage areas corresponding to a stage associated with the stage information; and the third logic circuit to store the context state information for the second context in a memory.

12. A machine-readable medium having stored thereon instructions, the instructions when executed by a machine, result in the following:

in response to a command to switch from a first graphics context to a second graphics context, retrieving context state information for the first graphics context, the context state information including stage information for one or more stages in a graphics pipeline, and being retrieved from one or more storage areas;

simultaneously loading the context state information for the first graphics context and context state information for the second graphics context into a graphics pipeline data path while keeping the context state information for the second graphics context behind the context state information for the first graphics context in the graphics pipeline data path; and storing context state information for the first graphics context in a memory, the context state information including information for a given stage of the first graphics context and a corresponding operation code indicating to which of the one or more storage areas the stage information corresponds.

13. The machine-readable medium of claim 12, wherein in response to a command to restore the first context state while the second context state is processed, the instructions when executed by the machine to additionally result in:

retrieving context state information for the second graphics context, the context state information including stage information for one or more stages in the graphics pipeline;

reading context state information for the first graphics context from the memory;

simultaneously loading the context state information for the second graphics context and the context state information for the first graphics context into the graphics pipeline data path while keeping the context state information for the first graphics context behind the context state information for the second graphics context in the graphics pipeline data path;

for each stage of the first graphics context, writing stage information into one or more storage areas corresponding to a stage associated with the stage information; and storing the context state information for the second graphics context in a memory.

14. The machine-readable medium of claim 13, the instructions when executed to additional result in receiving a command to process data, the command including an address to a storage area having stage information, the sequence of instructions to cause the processor to process the data in accordance with the stage information.

* * * * *